(12) United States Patent
Combest et al.

(10) Patent No.: US 6,354,397 B1
(45) Date of Patent: Mar. 12, 2002

(54) ATTACHMENT FIXTURE FOR THE FRONT PANEL AND GRILL OF A SPEAKER ASSEMBLY

(75) Inventors: Christopher E. Combest, Leawood; Robert R. Hoyes, Lenexa, both of KS (US)

(73) Assignee: Multi Service Corporation, Overland Park, KS (US)

( * ) Notice: Subject to any disclaimer, the term of this patent is extended or adjusted under 35 U.S.C. 154(b) by 0 days.

(21) Appl. No.: 09/588,375

(22) Filed: Jun. 6, 2000

(51) Int. Cl.[7] .............................................. A47B 81/06
(52) U.S. Cl. ........................ 181/199; 181/150; 181/141
(58) Field of Search ................................. 181/199, 150, 181/141

(56) References Cited

U.S. PATENT DOCUMENTS

| | | | | |
|---|---|---|---|---|
| 4,244,096 A | * | 1/1981 | Kashichi | 29/432 |
| 5,322,979 A | * | 6/1994 | Cassity et al. | 181/150 |
| 5,734,131 A | * | 3/1998 | Sakamoto | 181/141 |
| 5,996,728 A | * | 12/1999 | Stark | 181/144 |

* cited by examiner

*Primary Examiner*—Shih-Yung Hsieh
(74) *Attorney, Agent, or Firm*—Hovey, Williams, Timmons & Collins

(57) ABSTRACT

An audio speaker (10, 76) has a housing (12, 78) with a front panel (14, 80) secured thereto, and with a grille (18) removably mounted to the front panel (14, 80). A series of combined connection assemblies (20, 84) serve to connect both the panel (14, 80) to the housing (12, 78) and the grille (18) to the panel (14, 80). The assemblies (20, 84) include a socket (50) which is seated within a panel opening (34), with couplers (62) securing the panel (14, 80) to the housing (12, 78). An insert (70) is threadably received within the socket (50). Connectors (42) secured to the grille frame (38, 82) include a bifurcated resilient ball (68) which is frictionally received within an associated insert (70).

18 Claims, 3 Drawing Sheets

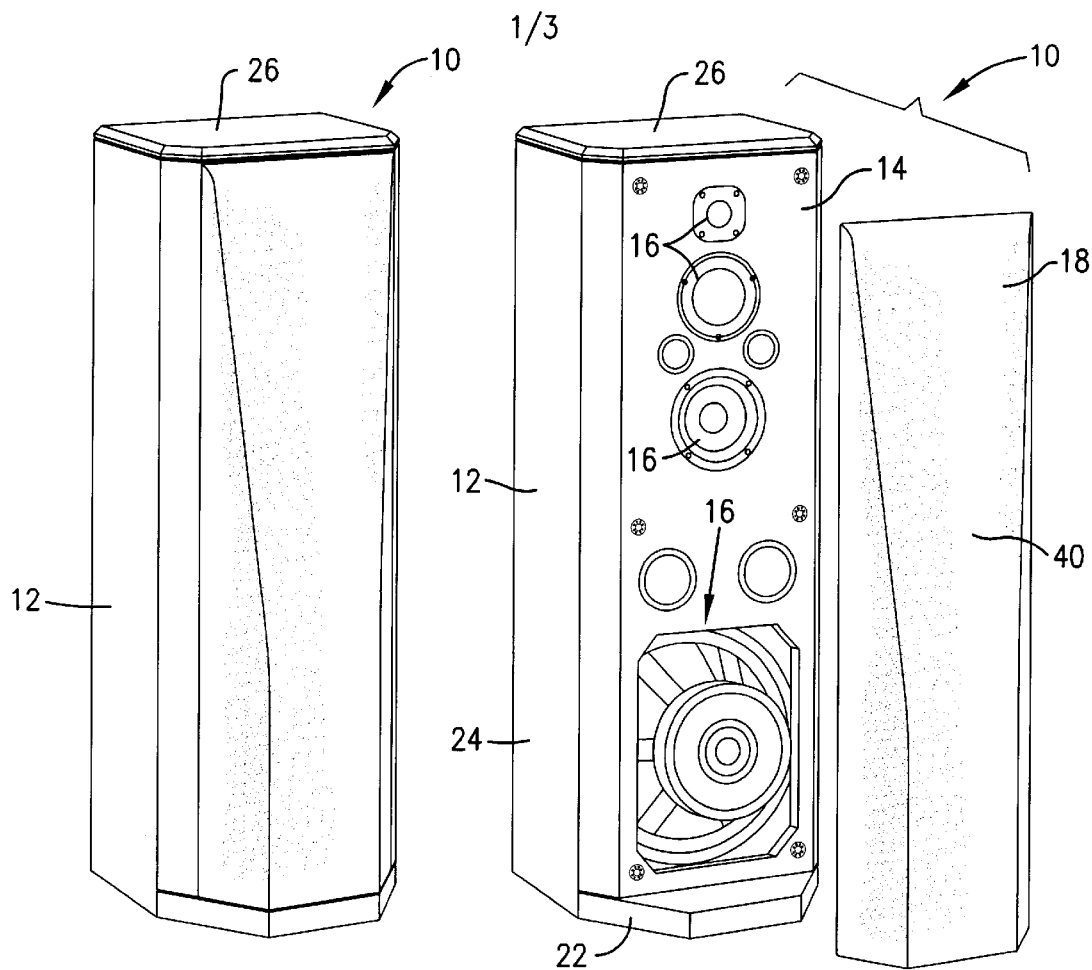
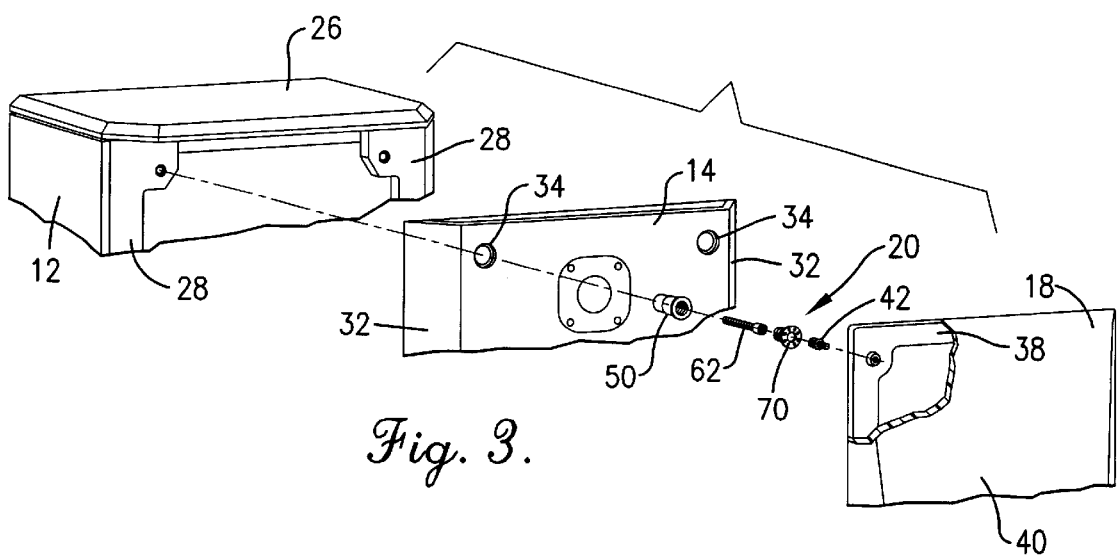

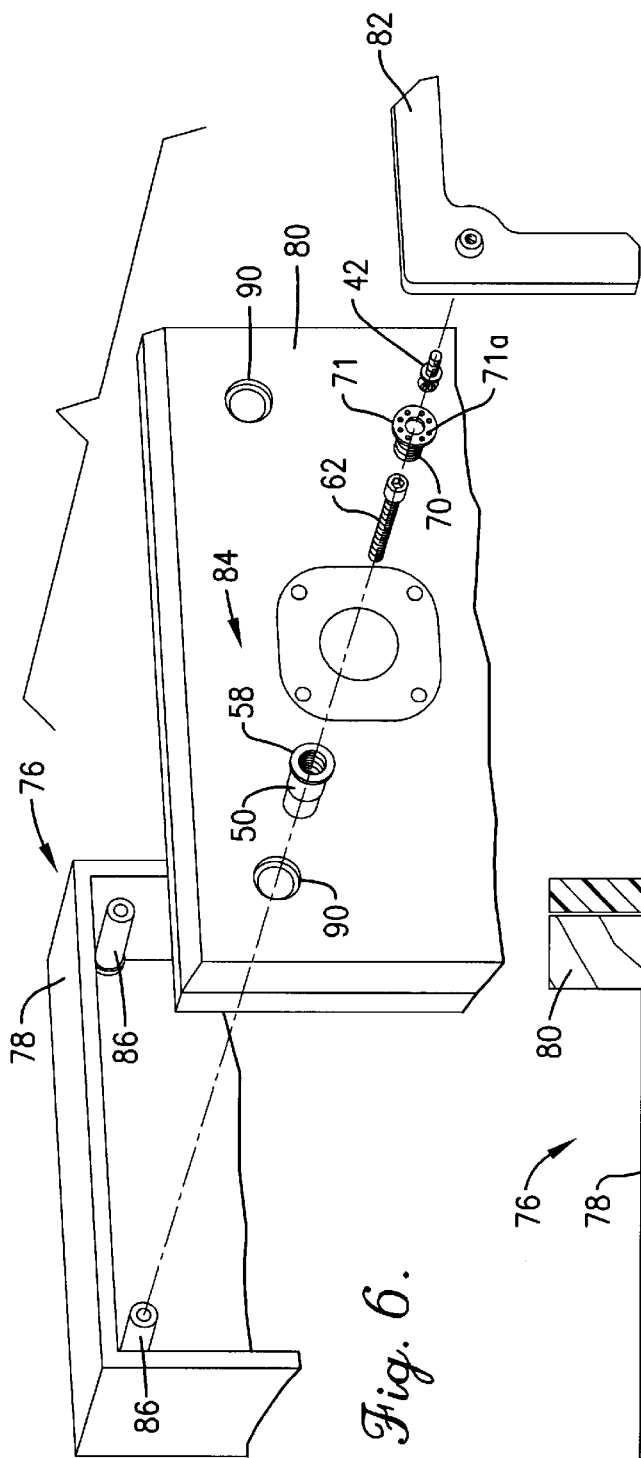
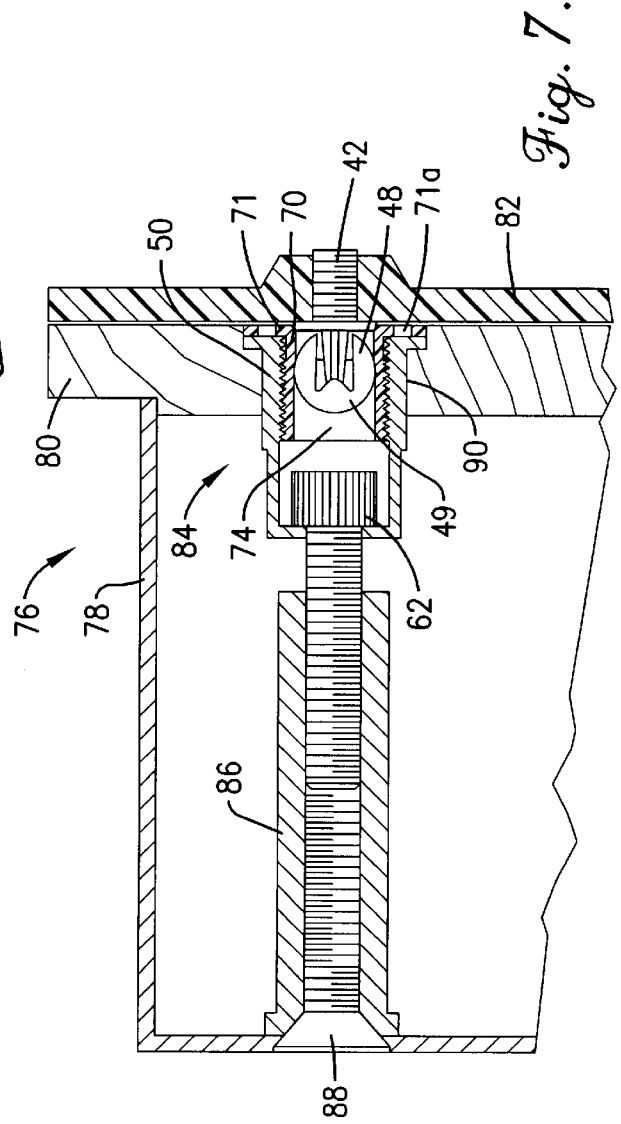

US 6,354,397 B1

ATTACHMENT FIXTURE FOR THE FRONT PANEL AND GRILL OF A SPEAKER ASSEMBLY

BACKGROUND OF THE INVENTION

1. Field of the Invention

The present invention is broadly concerned with combined connection assemblies designed for use with high quality audio speakers in order to provide a secure yet aesthetically pleasing connection between the speaker housing, front panel and removable grille. More particularly, the invention pertains to such connection assemblies and the associated speakers, wherein the connection assemblies include a socket received within the speaker front panel and secured to the underlying speaker housing, with a concentric insert within the socket designed for receiving a grille mounted friction connection member. In this way, the grille can be readily removed without the need for tools, and the appearance of the front panel and speaker housing is preserved.

2. Description of the Prior Art

Expensive, high-end audio speakers are a source of pride and satisfaction to their owners. Accordingly, every effort is made to enhance both the functional utility and appearance of such speakers. Conventionally, speakers of this type include a housing with a front panel secured over the housing and supporting a variety of individual speakers. When these speakers are equipped with a large sub-woofer speaker, it is necessary to make the front panel easily removable to gain access to the sub-woofer for installation and maintenance.

These speakers also typically include a decorative grille located over the front panel that protects the individual speakers from dust and other debris. In the past, separate connection assemblies have been required for attaching the speaker front panel to the housing, and for the removable attachment of the grille to the front panel. This requires separate openings for attaching the three components, which detracts from the appearance of the speaker, particularly when the grille is removed.

There is accordingly a need in the art for an improved connection assembly which combines the function of separate prior art connectors in order to mount both the speaker front panel and grille without extraneous openings or the like in the front panel.

SUMMARY OF THE INVENTION

The present invention overcomes the problems outlined above and provides an audio speaker in the form of a housing and a front panel with aligned connector-receiving openings formed therein, with a grille removably attached to the front panel. The speaker is improved by provision of combined connection assemblies serving to interconnect the front panel and grille to the housing. Each connection assembly includes a socket received within the front panel opening with a coupler extending from the socket and into the housing opening in order to secure the panel to the housing. Additionally, an insert is received within the socket and is retained therein by a mechanical interlock connection (e.g., a bayonet latch or a threaded connection, with the latter being preferred), and a connection member secured to the grille is received within the insert in a non-threaded, friction-fit manner. In this fashion, the grille may be manually removed from the front panel by separation of each grille connection member from its associated insert.

Preferably, the socket is in the form of a tubular member presenting an apertured base and an outwardly extending flange. When seated within the front panel opening, the flange engages the panel, while the base aperture is in alignment with the adjacent housing opening. The coupler is preferably an elongated bolt passing through the socket base aperture and into an associated threaded member secured to the speaker housing.

The insert is likewise tubular and essentially coaxial with the socket, presenting a smooth internal wall surface. The grille connection member is preferably in the form of a ball screw secured to the grille frame, with the ball being insertable into the adjacent socket insert in a friction fit manner.

BRIEF DESCRIPTION OF THE DRAWINGS

FIG. 1 is a perspective view of an upright audio speaker in accordance with the invention;

FIG. 2 is a view similar to that of FIG. 1, but illustrating the front grille removed from the speaker;

FIG. 3 is a fragmentary, exploded perspective view illustrating the combined connection assembly used in securing the front panel and grille of the speaker housing;

FIG. 6 is a view similar to that of FIG. 3, but depicting another embodiment in accordance with the invention, where a front panel and grille are mounted to the housing of a recessed audio speaker; and FIG. 7 is a fragmentary vertical sectional view illustrating the connection assembly used in the context of the recessed speaker of FIG. 6.

DETAILED DESCRIPTION OF THE PREFERRED EMBODIMENT

Figure 4:
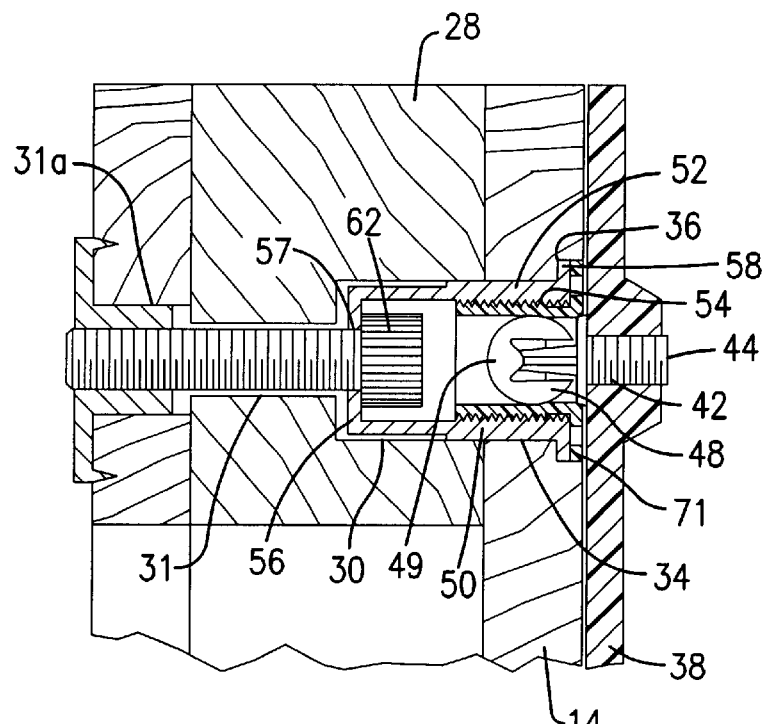
FIG. 4 is an enlarged, fragmentary view in vertical section illustrating the preferred connection assembly with the speaker front panel and grille attached to the speaker housing.

Turning now to the drawings, and particularly FIGS. 1 and 2, a high quality, upright, free standing audio speaker 10 is depicted. The speaker 10 includes an upright speaker housing 12, a front panel 14 secured to the housing 12 and supporting one or more audio speakers 16, and a removable grille 18 attached to the front panel 14. A plurality of combined connection assemblies 20 are employed to secure panel 14 to housing 12, and also to permit the detachable securement of the grille 18.

The housing 12 includes a base 22 upright side and rear walls 24, and top wall 26. The base 22 and walls 24, 26 are typically formed of high grade wood to give the speaker 10 an enhanced visual appearance. As best seen in FIG. 3, the front rails 28 of housing 12 have recessed connector-receiving recesses 30 at the top and bottom thereof, for a total of four essentially corner-mounted recesses 30. An elongated passageway 31 is also provided concentric with each recess 30, together with an enlarged, concentric opening 31a formed in the rearmost segment of the side rail 28 (see FIG. 4).

The front panel 14 is adapted to support the speakers 16, and is further configured to overlie the front of housing 12. Again, the panel 14, and particularly the beveled side margins 32 thereof, is formed of high grade wood matching that of the housing walls. In addition, and again referring to FIG. 3, it will be seen that the panel 14 is equipped with four through openings 34 at the corners thereof. When the panel 14 is properly positioned over the housing front, the panel openings 34 are in registry with the recesses 30. Referring to FIG. 4, note that the openings 34 have an circular offset region 36 adjacent the outer margin of the panel 14.

The grille 18 is configured to overlie the main portion of front panel 14 inboard of the beveled side margins 32. The grille is made up of a circumscribing frame 38 with soft, sound-transmitting material 40 such as low density foam covering the frame 38. The frame has, at each corner thereof, a synthetic resin ball connector 42 in the form of a threaded shank 44 received by the frame with a circular reinforcement 46 adjacent the inner surface of the frame and a resilient synthetic resin bifurcated connector ball 48 presenting opposed, shiftable segments 49. The connectors 42 are strategically located so that, when the grille 18 is properly disposed over the panel 12, the connectors are essentially concentric with the panel openings 34.

A connection assembly 20 is located at each of the aligned openings 34 and recesses 30. In particular, each such assembly 20 includes an elongated, generally cup-shaped socket 50 formed of metal or hard synthetic resin material, having a sidewall 52 which is internally threaded as at 54, and a base 56 having a central aperture 57 therethrough. The outermost end of socket 50 has a laterally extending annular flange 58. Each socket 50 is seated within an aligned opening presented by a panel opening 34 and recess 30, with the flange 58 seated within offset 36 and with the aperture 57 in alignment with the passageway 31.

An elongated coupler in the form of a bolt 62 extends through base opening 56, along passageway 31, and into opening 31a. A nut 64 threadably receives the end of the bolt shank. The nut 64 has an annular base 66, and a circular, forwardly extending retainer tooth 68 which extends into the rearmost wooden segment of the side rail 28.

Figure 5:
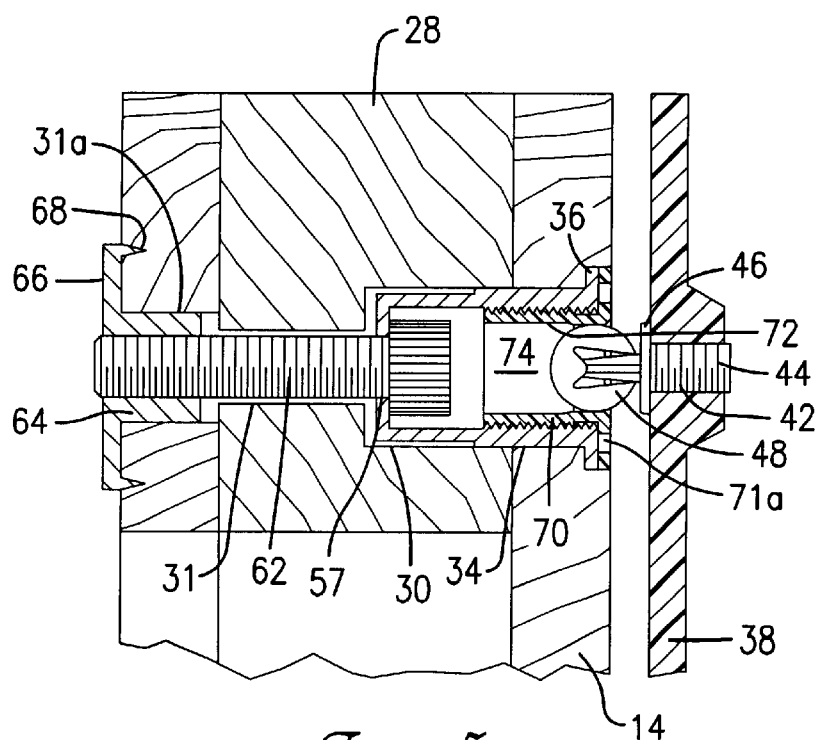
FIG. 5 is a view similar to that of FIG. 6, but illustrating the manner in which the grille may be removed from the speaker front panel.

Each overall assembly 20 additionally has an annular, externally threaded, synthetic resin insert 70 which is received within socket 50 and mated with threading 54; the outer end of the insert 70 includes a flange 71 having circumferentially spaced openings 71a which seats against socket flange 58. The insert 70 has a smooth internal sidewall surface 72 and defines an elongated, cylindrical chamber 74. The chamber 74 is designed to receive the bifurcated connector ball 48 of a grille connector 42 as illustrated in FIG. 4. The ball 48, when pressed into the associated chamber 74, slightly deforms owing to the bifurcated construction thereof (i.e., the segments 49 contract inwardly) to yield a tight frictional fit of the grille 18 to the panel 14. However, the grille may be removed by simply pulling the corners thereof so as to separate the balls 48 from their associated chambers 74. This separation operation is shown in FIG. 5, for example.

FIGS. 6 and 7 illustrate an alternative embodiment in accordance with the invention wherein a recessed speaker 76 is employed. In such a case, the speaker has a housing 78, front panel 80 and a covering grille including peripheral frame 82. As before, the panel 80 is designed to cover the front of housing 78, while the grille is removably mounted to the panel 80. A plurality of connector assemblies 84 are used to secure both the panel 80 and grille in place. The assemblies 84 are for the most part identical with the previously described assemblies 20, and therefore like parts are shown with the same reference numerals.

As best shown in FIG. 7, in this embodiment the housing 78 is equipped with corner-mounted, internally threaded annular standoffs 86 which are secured to the back wall of the housing via screws 88. The panel 80 has four stepped openings 90 formed in the corners thereof, which are aligned with the standoffs 86. Each assembly 84 includes the socket 50 seated within opening 80. The bolt 62 is seated within the socket 50 as shown and is threadably received by the associated standoff 86. The insert 70 is threadably received within the socket 50 and presents the chamber 74. The grille frame 82 has corner-mounted connectors 42 including bifurcated balls 48. The latter are frictionally removably secured within the associated insert chambers 74.

What is claimed is:

1. In an audio speaker comprising a housing and a front panel, said housing and front panel having aligned connector-receiving openings formed therein, and a grille attached to said front panel, said speaker including one or more speakers behind said grille, the improvement of a combined connection assembly comprising:
    an internally threaded socket received within said front panel opening;
    a coupler extending from said socket into said housing opening in order to secure said panel to said housing;
    an insert threadably received within said socket; and
    a connection member secured to said grille and received within said insert in a non-threaded friction-fit manner,
    said grille being manually removable from said front panel by separation of said connection member from said insert.

2. The speaker of claim 1, said socket presenting a tubular sidewall and an apertured base, an outwardly extending flange on said sidewall and engaging said front panel, said coupler extending through said apertured base and into said housing opening.

3. The speaker of claim 2, said coupler comprising a bolt extending through said apertured base and received within a complemental nut, said nut secured to said housing.

4. The speaker of claim 3, said nut presenting a tubular threaded section receiving said bolt, said nut secured to said housing by a screw received within said threaded section remote from said bolt.

5. The speaker of claim 1, said insert comprising an externally threaded tubular body presenting an internal chamber, said connection member comprising a bifurcated component adapted to fit within said chamber and frictionally engage said tubular body.

6. The speaker of claim 1, including a series of spaced apart and aligned connector-receiving openings in said housing and front panel, there being a like series of combined connection assemblies respectively received within each of said aligned connector-receiving openings.

7. The speaker of claim 1, said grille including a circumscribing frame, and a soft, sound-transmitting material covering said frame, said connection member being secured to said frame.

8. A combined connection assembly for use in attaching the front panel and grille of an audio speaker to the housing of a speaker, said housing and front panel having aligned connector-receiving openings formed therein, said connection assembly comprising:
    an internally threaded socket for receipt within said front panel opening;
    a coupler extending from said socket into said housing opening in order to secure said panel to said housing;
    an insert threadably received within said socket; and
    a connection member adapted for securement to said grille and receivable within said insert in a non-threaded friction-fit manner, said grille being manually removable from said front panel by separation of said connection member from said insert.

9. The assembly of claim 8, said socket presenting a tubular sidewall and an apertured base, an outwardly extending flange on said sidewall and engaging said front panel, said coupler extending through said apertured base and into said housing opening.

10. The assembly of claim 9, said coupler comprising a bolt extending through said apertured base and received within a complemental nut, said nut secured to said housing.

11. The assembly of claim 10, said nut presenting a tubular threaded section receiving said bolt, said nut securable to said housing by a screw received within said threaded section remote from said bolt.

12. The assembly of claim 8, said insert comprising an externally threaded tubular body presenting an internal chamber, said connection member comprising a bifurcated component adapted to fit within said chamber and frictionally engage said tubular body.

13. The assembly of claim 8, including a series of spaced apart and aligned connector-receiving openings in said housing and front panel, there being a like series of combined connection assemblies respectively received within each of said aligned connector-receiving openings.

14. The assembly of claim 8, said grille including a circumscribing frame, and a soft, sound-transmitting material covering said frame, said connection member being secured to said frame.

15. In an audio speaker comprising a housing and a front panel, said housing and front panel having aligned connector-receiving openings formed therein, and a grille attached to said front panel, said speaker including one or more speakers behind said grille, the improvement of a combined connection assembly comprising:

a socket received within said front panel opening;

a coupler extending from said socket into said housing opening in order to secure said panel to said housing;

an insert received within said socket and retained therein by a mechanical interlock connection; and a connection member secured to said grille and received within said insert in a non-threaded friction-fit manner, said grille being manually removable from said front panel by separation of said connection member from said insert.

16. The speaker of claim 15, said insert being retained within said socket by a threaded connection.

17. A combined connection assembly for use in attaching the front panel and grille of an audio speaker to the housing of a speaker, said housing and front panel having aligned connector-receiving openings formed therein, said connection assembly comprising:

an socket for receipt within said front panel opening;

a coupler extending from said socket into said housing opening in order to secure said panel to said housing;

an insert received within said socket and retained therein by a mechanical interlock connection; and a connection member adapted for securement to said grille and receivable within said insert in a non-threaded friction-fit manner, said grille being manually removable from said front panel by separation of said connection member from said insert.

18. The assembly of claim 17, said insert being retained within said socket by a threaded connection.

* * * * *